(12) United States Patent
Ji et al.

(10) Patent No.: US 7,172,686 B1
(45) Date of Patent: Feb. 6, 2007

(54) METHOD OF INCREASING DISTILLATES YIELD IN CRUDE OIL DISTILLATION

(75) Inventors: Shuncheng Ji, Katy, TX (US); Miguel J. Bagajewicz, Norman, OK (US)

(73) Assignee: The Board of Regents of the University of Oklahoma, Norman, OK (US)

(*) Notice: Subject to any disclaimer, the term of this patent is extended or adjusted under 35 U.S.C. 154(b) by 541 days.

(21) Appl. No.: 10/387,171

(22) Filed: Mar. 12, 2003

Related U.S. Application Data

(63) Continuation of application No. 10/298,016, filed on Nov. 14, 2002, now abandoned.

(51) Int. Cl.
*C01G 7/00* (2006.01)
*C01G 34/00* (2006.01)

(52) U.S. Cl. ............. 208/354; 208/48 AA; 208/251 R; 208/349; 208/352; 208/357; 208/364; 208/365

(58) Field of Classification Search ........... 208/48 AA, 208/251 R, 349, 352, 354, 364, 365, 357
See application file for complete search history.

(56) References Cited

U.S. PATENT DOCUMENTS

| | | | |
|---|---|---|---|
| 3,308,060 A * | 3/1967 | Ellis ........................... 208/364 |
| 3,798,153 A * | 3/1974 | Arndt, Jr. et al. ........ 208/48 AA |
| 3,886,062 A * | 5/1975 | Peiser et al. ................. 208/354 |
| 4,082,653 A * | 4/1978 | DeGraff ................... 208/251 R |
| 4,131,538 A * | 12/1978 | Rose et al. .................. 208/352 |
| 4,239,618 A | 12/1980 | Peiser et al. |
| 4,274,944 A * | 6/1981 | Bannon ....................... 208/352 |
| 4,308,130 A | 12/1981 | Bannon |
| 4,321,132 A * | 3/1982 | Richards ..................... 208/352 |

FOREIGN PATENT DOCUMENTS

| | | |
|---|---|---|
| JP | 54020007 A | 2/1979 |
| JP | 55069693 A | 5/1980 |
| JP | 55086883 A | 7/1980 |
| JP | 60061002 A | 4/1985 |
| JP | 60101191 A | 6/1985 |
| JP | 60118202 A | 6/1985 |
| JP | 61050602 A | 3/1986 |
| JP | 61133289 A | 6/1986 |
| JP | 62119293 A | 5/1987 |
| JP | 63006086 A | 1/1988 |
| JP | 4114088 A | 4/1992 |
| WO | WO 9958449 A2 | 11/1999 |

* cited by examiner

*Primary Examiner*—Glenn Caidarola
*Assistant Examiner*—Prem C. Singh
(74) *Attorney, Agent, or Firm*—Dunlap, Codding & Rogers, P.C.

(57) ABSTRACT

Methods of separating components of a mixture, such as crude oil, are disclosed which increase the yield of individual components while decreasing the yield of residue. In one method, a heated mixture is fed to a column, a vapor stream is withdrawn from the column and separated, and a portion of the vapor stream is recycled back to the column. In another method, a mixture is separated into streams composed substantially of components having light, intermediate or heavy molecular weight and/or low, intermediate or high boiling point, respectively, and the streams are fed into the column at different positions. In both methods, individual light, intermediate and/or heavy molecular weight and/or low, intermediate and/or high boiling point component streams are then selectively withdrawn from the column.

57 Claims, 6 Drawing Sheets

US 7,172,686 B1

METHOD OF INCREASING DISTILLATES YIELD IN CRUDE OIL DISTILLATION

CROSS-REFERENCE TO RELATED APPLICATIONS

This application is a continuation of U.S. Ser. No. 10/298,016, filed Nov. 14, 2002 now abandoned, the contents of which are hereby expressly incorporated herein by reference in their entirety.

STATEMENT REGARDING FEDERALLY SPONSORED RESEARCH OR DEVELOPMENT

Not Applicable.

BACKGROUND OF THE INVENTION

Crude oil distillation is used to separate petroleum crude into several products, including naphtha, kerosene, diesel and gas oil, for example. Such products of crude oil distillates may either be sent out as final products or may be further processed. Crude oil distillation is not only an indispensable unit in a refinery but is also the largest unit among all petroleum or chemical processing units. One of the major objectives of crude oil distillation design and operation is to increase the amount of distillate products, because the distillate products are much more valuable than the residue. However, the yield of distillates is limited by the allowable maximum temperature, above which substantial thermal cracking takes place, thereby resulting in loss of product and fouling of equipment.

In an atmospheric-vacuum distillation system with both atmospheric tower and vacuum tower, it is economically desirable to increase the amount of atmospheric distillates and reduce the atmospheric residue, which feeds the vacuum tower. On the basis of one barrel distillate product, vacuum distillation requires extra energy to maintain a vacuum system. Energy is required to remove leaked air, non-condensables in the oil and light olefins formed by thermal cracking. On the basis of the same capacity, a vacuum tower would be much larger in size and therefore more expensive because one pound of vaporized oil at 10 mmHg absolute pressure requires a space about 70 times larger than that required at atmospheric pressure.

Therefore, there exists a need in the art for new and improved methods of crude oil separation that increase the yield of products such as diesel and gas oil and therefore overcome the disadvantages and defects of the prior art.

DETAILED DESCRIPTION OF THE INVENTION

Figure 1:
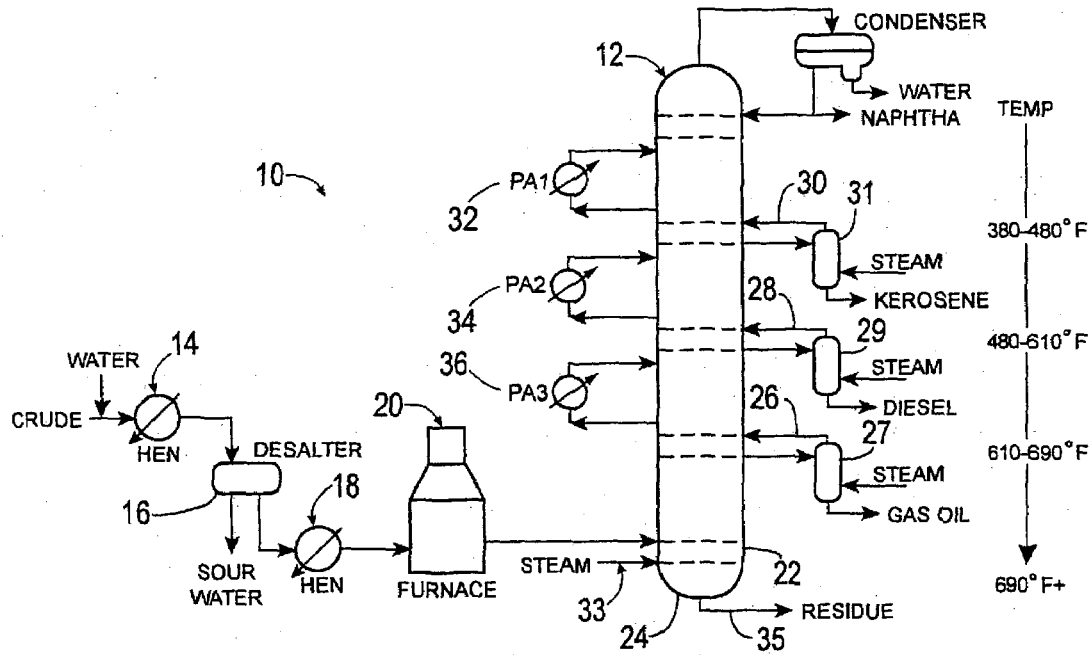
FIG. 1 is a schematic representation illustrating a crude oil separation method utilizing a conventional crude oil distillation unit of the prior art.
Figure 2:
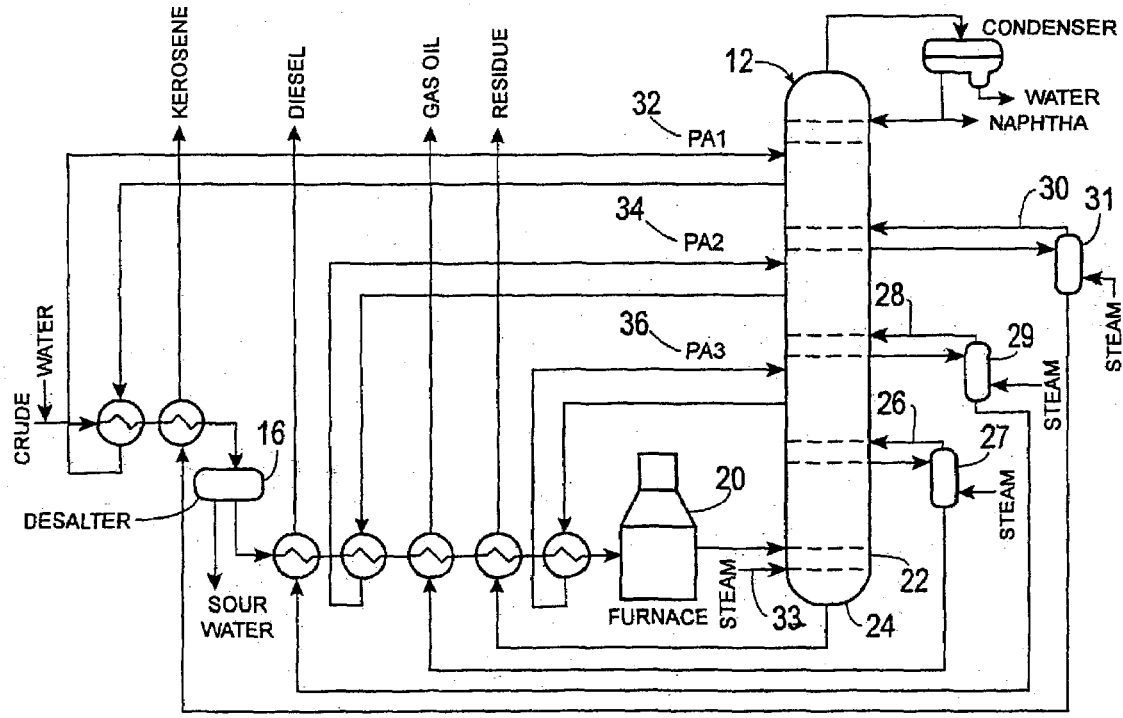
FIG. 2 is a schematic representation illustrating one embodiment of heat exchanger networks of the conventional crude oil distillation unit of FIG. 1 in detail.

FIGS. 1 and 2 illustrate a method of crude oil separation utilizing a conventional atmospheric crude oil distillation unit 10 of the prior art. Proper separation of the crude oil into products by the conventional crude oil distillation unit 10 requires the crude oil to be heated and partially vaporized before being fed into a distillation column 12 of the conventional crude oil distillation unit 10. Crude oil contains salts which can be harmful to downstream equipment and must be removed. To remove the salts, water is mixed with the crude oil and typically heated to temperatures between about 220° F. to about 280° F. To achieve these temperatures, the crude is first heated up by exchanging heat with product streams and/or pumparound streams in a heat exchanger network (HEN). An example of such an HEN is illustrated in detail in FIG. 2 as well as indicated schematically by a circle and the reference numeral 14 in FIG. 1. Once heated up, the mixture enters a unit called a desalter 16. Water containing the salts is removed in the desalter 16, and the salt-free crude oil is further heated up in a second heat exchanger network (HEN) 18. Since the amount of heat available from products coming from the distillation column 12 is not enough to heat the crude oil in the second HEN 18 to its desired temperature, a furnace 20 is used to assist the crude oil in achieving the desired high temperature (typically between about 650° F. to about 700° F. The distillation column 12 of the prior art conventional crude oil distillation unit 10 is a device that places crude vapors in contact with liquids in a countercurrent fashion. The partially vaporized crude from the furnace 20 is fed into a flash zone 22 of the atmospheric distillation column 12, where the vapor and liquid separate. The vapor includes all the components that comprise the products (such as naphtha, kerosene, diesel and gas oil), while the liquid contains residue and a small amount of relatively light components in the range of gas oil. These components are also removed from the residue by steam injection 33 at a bottom 24 of the distillation column 12. As the crude vapors rise, their contact with liquid causes it to change its composition. The descending liquid also changes its composition, so that at different stages, liquid is extracted from trays and sent to units called side-strippers (generally represented by the reference numerals 27, 29 and 31 in FIG. 1) in which final conditioning of the products using steam takes place, while the vapors are stripped and the steam returned to the column through streams 26, 28 and 30. In addition, to more effectively remove heat, liquid is extracted at various points in the distillation column 12 and cooled down for reinjection at a different position on the column. These heat removal devices (heat exchangers) are indicated schematically as PA1, PA2 and PA3 in FIG. 1 as a circle with an arrow and generally represented by the reference numerals 32, 34 and 36, respectively, and are referred to as pumparounds in the petroleum refining jargon. Cooling water can be used in the heat exchangers PA1 32, PA2 34 and PA3 36, but it is always more advantageous to have these streams release their heat to the raw crude oil in the heat exchanger networks (HEN) 14 and 18. FIG. 2 illustrates one embodiment of the prior art conventional crude oil distillation unit 10 with real connections of the heat exchanger networks 14 and 18 consisting of heat exchangers between the crude and the products from the side-strippers 27, 29 and 31 and the pumparounds PA1 32, PA2 34 and PA3. Although it is not indicated in the figure, the condenser is also used to heat up the crude, typically as part of the heat exchanger network 14 of FIG. 1. Several different designs and configurations for such connections in the conventional crude oil distillation unit 10 are possible, of which the one shown in FIG. 2 is just an example. For example, it is often found that the crude is split into two or more streams, which are heated by products and pumparound streams, and these streams merge again before entering into the desalter. The stream that leaves the desalter very often is also split to exchange heat and merge before entering into the furnace. In addition, in other prior art crude oil distillation units, gas oil is not produced and instead becomes part of the residue. Such prior art crude oil distillation units contain one less side-stripper and one less pumparound than that shown in FIGS. 1 and 2. Further, in prior art crude oil distillation units in which gas oil is not produced, the diesel may be further separated into heavy and light diesel.

In summary, in the conventional crude oil distillation unit 10 of the prior art (FIGS. 1 and 2), crude oil is heated to a predetermined temperature and fed into the main distillation column 12 in a region called the flash zone 22, where the resulting vapor and residue are separated. The vapor rises towards the top of the crude oil distillation column 12 and is put in contact with descending liquid reflux streams, such as the return streams of the pumparounds and the top naptha reflux. Side products are withdrawn at different positions based on the temperature of the distillation column 12 at the particular position. Further, in the case of atmospheric distillation, conditioning of these side products takes place in separate steam strippers 27, 29 and 31. In the case of vacuum distillation, for example, side strippers are not used. The resulting residue stream 35 is stripped with steam 33 in the bottom section 24 of the distillation column 12, called the stripping section, to recover light components.

Because the value of residue 35 is lower than that of other products, it is economically desirable to produce more distillate products and decrease the yield of residue. To achieve this objective, a large amount of steam 33 is injected at the bottom 24 of the distillation column 12 to strip light components (mainly gas oil components) from the residue 35. Steam injection is limited by water saturation of the plates of the distillation column 12. The injection of a large amount of steam 33 results in higher steam consumption and larger cooling duties. Once the crude is processed in the atmospheric distillation column 12, the residue stream 35 (FIG. 1) is usually sent to a vacuum distillation column.

Figure 3:
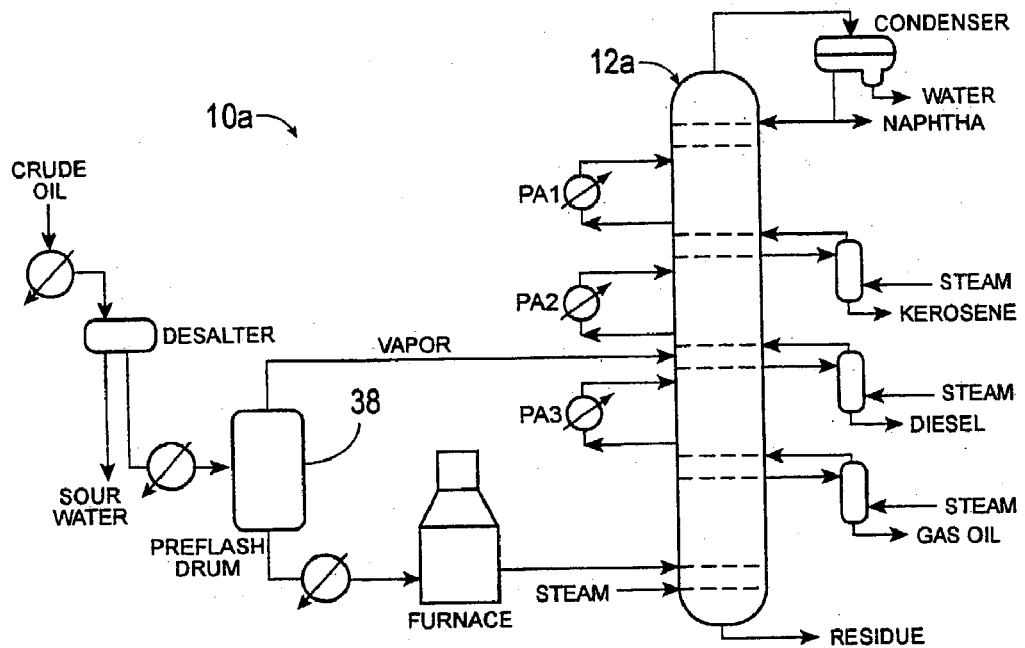
FIG. 3 is a schematic representation illustrating a crude oil separation method utilizing a crude oil distillation unit having a preflash design of the prior art.

Other examples of prior art crude oil distillation unit designs include a crude oil distillation unit 10a having a pre-flash design (as illustrated in FIG. 3) and a crude oil distillation unit having a pre-fractionation design (not shown). Pre-flash and pre-fractionation designs of crude oil distillation units are constructed from similar components and in a similar fashion as the crude oil distillation unit 10 described herein before, but differ from conventional designs in that some separation of light gasoline is performed at lower temperatures. The pre-flash design crude oil distillation unit 10a utilizes a device called a flash unit 38, and a top product from the flash unit 38 (labeled "vapor" in FIG. 3) is injected into an atmospheric distillation column 12a of the pre-flash design crude oil distillation unit 10a. In a pre-fractionation design crude oil distillation unit (not shown), a conventional distillation column is used upstream of the furnace and main column to separate light components, and a top product of light components from the column has commercial value and is sent to storage. Several variations of these arrangements of crude oil distillation units are currently used in practice. Including a flash unit or a pre-fractionation column upstream of the atmospheric distillation column removes most of the light components present in the crude oil charge, thereby reducing the load on the atmospheric distillation column.

The present invention is directed to a method for increasing the yields of diesel and gas oil in crude oil distillation while reducing steam consumption and residue yield. In the prior art, this was accomplished by increasing the steam injection 33 into the crude oil distillation unit 10 (FIG. 1). In the present invention, a hydrocarbon-rich mixture containing steam is extracted below the flash zone. This stream is cooled down, and the liquid is separated, while the vapor is eventually recycled to the column. In another embodiment of the present invention, the bulk of the components that are targeted for separation from the residue in the flash zone are separated before injecting the crude into the column, as will be described in more detail herein after.

The present invention is also directed to methods of separating other mixtures, such as, but not limited to, vegetables oils, mixtures of aromatics, synthetic crude or mixtures of hydrocarbons coming from catalytic crackers, and the like. One embodiment of the present invention includes a method of separating components of a mixture that includes at least a first component having light molecular weight and/or low boiling point and a second component having heavy molecular weight and/or high boiling point. The mixture may further include one or more additional components of varying intermediate molecular weights and/or intermediate boiling points. A mixture containing a first component, a second component and an intermediate component is described herein for the purpose of example only. In the case of crude oil, one can consider the first component to be composed of naphtha, kerosene and diesel, the second component to be composed of residue and one intermediate component to be composed of gas oil. However, in certain circumstances where the gas oil is not separated, the light or first component can be composed of naphtha and kerosene, the second component composed of residue and gas oil, and the intermediate component composed of diesel.

The mixture is heated to a temperature sufficient to permit separation of the mixture into a first stream rich in the first component and a second stream rich in the intermediate component whereby, upon passage of the mixture through a column, the column is capable of separating the mixture into the first stream rich in the first component and the second stream rich in the intermediate component, thereby leaving a heavy residue in a bottom of the column, wherein the heavy residue is rich in the second component. The temperature to which the mixture is heated will vary depending upon the contents of the mixture. However, the temperature to which the mixture is heated must be sufficient to permit separation of the mixture into streams rich in the separate components upon passage through a column. In the case of crude oil, the temperatures that may be used in accordance with the present invention include a range of from about 500° F. to about 800° F. For other mixtures, these ranges of temperatures vary according to the boiling points of the light and heaviest compounds of the mixture.

The heated mixture is then fed into a column having a flash zone, such as an atmospheric distillation or a vacuum column in petroleum fractionation. A vapor stream is then withdrawn from the column at a position below the flash zone of the column, and the vapor stream is cooled and separated into a condensate and a resultant vapor stream. Following this step, at least one of the resultant vapor stream and the condensate is recycled to the column. If the resultant vapor stream is recycled to the column, the resultant vapor stream may be heated and/or recompressed prior to recycling the resultant vapor stream into the column. If the condensate is recycled to the column, rather than feeding the condensate directly into the column, the condensate may be introduced into a side-stripper that feeds into the column. It also may be necessary to add an additional non-condensable or condensable compound or mixture of compounds in small amounts at the temperature of the flash zone and/or below the temperature of the flash zone. Such non-condensable or partially condensable compound or mixture of compounds is then eventually recycled as a vapor back to the column. Examples of non-condensable compounds for the case of crude distillation are, but are not limited to, methane, nitrogen, carbon dioxide, light hydrocarbon gases and the like.

In the final step of the method of the present invention, at least one of the first stream rich in the first component and the second stream rich in the intermediate component is selectively withdrawn from the column such that the yield of at least one of the first and intermediate components is increased and the yield of residue is decreased.

One mixture that may be separated by the method described herein above is crude oil, wherein the crude oil comprises naphtha, kerosene, diesel, gas oil and residue. In one such method, the crude oil is heated to a temperature sufficient to permit separation of the crude oil into a naphtha stream, a kerosene stream, a diesel stream and a gas oil stream upon passage through a column. Such temperatures are well known to a person of ordinary skill in the art and may vary depending upon the particular composition of the crude oil. However, generally the temperature utilized in the method of the present invention will be in a range of from about 300° F. to about 1000° F. In the final step of the method of the present invention, at least one of the naphtha stream, the kerosene stream, the diesel stream and the gas oil stream is selectively withdrawn from the column such that the yield of at least one of naphtha, kerosene, diesel and gas oil is increased and residue yield is decreased.

In another method of separating components of crude oil, the crude oil is heated to a temperature sufficient to permit separation of the crude oil into a naphtha stream, a kerosene stream, a diesel stream and a gas oil stream upon passage through a column. Columns and heating temperatures that may be utilized in accordance with the present invention have been described herein above. The heated crude oil is then fed to the column, and a vapor stream is withdrawn from the column at a position below the flash zone of the column. The vapor stream is then separated into a condensate of heavy components and a resultant vapor stream, such as by cooling the vapor stream to form a condensate and separating the resultant vapor stream from the condensate.

The condensate of heavy components may then be recycled either directly to the column or to a side-stripper that feeds the column. The resultant vapor stream may be disposed of or further processed. In the final step, at least one of the naphtha stream, the kerosene stream, the diesel stream and the gas oil stream is selectively withdrawn from the column such that the yield of at least one of naphtha, kerosene, diesel and gas oil is increased and residue yield is decreased.

In another embodiment of the present invention, an initial mixture containing at least one component having light molecular weight and/or low boiling point, at least one component having heavy molecular weight and/or high boiling point, and at least one component having intermediate molecular weight and/or intermediate boiling point is separated. In the case of crude oil, the light molecular weight component can be considered as composed of kerosene and diesel oil, the heavy molecular weight component as composed of residue and the intermediate molecular weight component as composed of gas oil. The method involves separating the initial mixture into two streams, a first stream composed substantially of components of intermediate molecular weight and/or intermediate boiling point and a second stream composed substantially of light molecular weight and/or low boiling point and heavy molecular weight and/or high boiling point components, and feeding the second stream into a column in the flash zone as described herein above. The first stream composed substantially of components of intermediate molecular weight and/or intermediate boiling point may also be fed into the column, and when fed into the column, the first stream is fed into the column at a different location than the location at which the second stream is fed into the column.

In the final step, at least one light molecular weight and/or low boiling point component stream, at least one intermediate molecular weight and/or intermediate boiling point component stream or at least one heavy molecular weight or high boiling point component stream is selectively withdrawn from the column such that the yield of individual components of the initial mixture is increased. The initial mixture may include at least two individual components having light, heavy or intermediate molecular weight and/or low, high or intermediate boiling point, respectively, and when the initial mixture includes two components having similar molecular weights and/or boiling points, the final step will include selectively withdrawing at least a first light/heavy/intermediate molecular weight and/or low/high/intermediate boiling point component stream and a second light/heavy/intermediate molecular weight and/or low/high/intermediate boiling point component stream from the column.

Alternatively, rather than separating the first stream composed substantially of components of intermediate molecular weight and/or intermediate boiling point from the initial mixture to leave the second stream composed substantially of light and heavy molecular weight and/or low and high boiling point components to be fed into the column together, the initial mixture may be separated into a first stream rich in light molecular weight and/or low boiling point components, a second stream rich in heavy molecular weight and/or high boiling point components, and a third stream rich in intermediate molecular weight and/or intermediate boiling point components, and each of the streams are fed into a column as described herein above and capable of separating the initial mixture into at least one stream composed substantially of one individual light molecular weight and/or low boiling point component, at least one stream composed substantially of one individual intermediate molecular weight and/or intermediate boiling point component, and at least one stream composed substantially of one individual heavy molecular weight and/or high boiling point component. The first stream is fed into a first position on the column, the second stream is fed into a second position on the column, and the third stream is fed into a third position on the column. In one embodiment, the first, second and third positions are at different locations on the column.

A similar method to the method of separating the three components described in the paragraph above may be utilized, except that the liquid stream composed of substantially heavy molecular weight and/or high boiling point components from the first flash drum is not mixed with the remaining vapor stream composed of substantially light molecular weight and/or low boiling point components from the second flash drum, thereby providing the three separate streams rich in light, heavy or intermediate molecular weight and/or low, high or intermediate boiling point components.

The step of separating the initial mixture into the first, second and third streams may include heating the initial mixture to a temperature sufficient to permit separation of the initial mixture into a liquid stream and a vapor stream and feeding the heated initial mixture to a first flash drum to separate the initial mixture into the vapor stream composed substantially of light and intermediate molecular weight and/or low and intermediate boiling point components and the liquid stream composed substantially of heavy molecular weight and/or high boiling point components (i.e., the second stream). The vapor stream is then cooled and fed to a second flash drum to separate a condensate stream composed substantially of intermediate molecular weight and/or intermediate boiling point components (i.e., the third stream) and a remaining vapor stream composed substantially of light molecular weight and/or low boiling point components (i.e., the first stream). Then, the liquid stream composed substantially of heavy molecular weight and/or high boiling point components from the first flash drum (i.e., the second stream) is combined with the remaining vapor stream composed substantially of light molecular weight and/or low boiling point components from the second flash drum (i.e., the first stream) to provide a stream composed substantially of heavy and light molecular weight and/or high and low boiling point components.

One mixture that may be separated by the methods described herein above is crude oil comprising naphtha, kerosene, diesel, gas oil and residue. In the final step of the method, at least one of the naphtha stream, the kerosene stream, the diesel stream and the gas oil stream is selectively withdrawn from the column such that the yield of at least one of naphtha, kerosene, diesel and gas oil is increased and residue yield is decreased.

Yet another embodiment of the present invention is directed to a method of separating components of crude oil comprising naphtha, kerosene, diesel, gas oil and residue. The crude oil is heated to a temperature sufficient to permit separation of the crude oil into a vapor stream and a liquid stream, such as but not by way of limitation, a temperature in a range of from about 300° F. to about 1000° F., more preferably in a range of from about 400° F. to about 800° F., and most preferably in a range of from about 500° F. to about 700° F. The heated crude oil is then fed into a first flash drum that separates the crude oil into the vapor stream and the liquid stream. The vapor stream is then cooled and fed to a second flash drum to separate the vapor stream into condensate and a remaining vapor stream, wherein the condensate comprises gas oil components and the remaining vapor stream comprises light components. The condensate is then fed into a column capable of separating the crude oil into a naphtha stream, a kerosene stream, a diesel stream and a gas oil stream, such as a distillation or vacuum column. The condensate is fed into the column above the flash zone of the column. The liquid stream from the first flash drum and the remaining vapor stream from the second flash drum are mixed to provide a mixture, and the mixture is then heated and fed into the flash zone of the column. Finally, at least one of the naphtha stream, the kerosene stream, the diesel stream and the gas oil stream is selectively withdrawn from the column such that the yield of at least one of naphtha, kerosene, diesel and gas oil is increased and residue yield is decreased.

In an alternative of the method described immediately above, the condensate from the second flash drum may be split into at least two liquid streams prior to feeding the condensate into the column such that the at least two split liquid streams containing intermediate components are fed into the column at different locations of the column. The at least two split liquid streams may be fed directly into the column, or at least one of the split liquid streams may be fed into a side-stripper that feeds into the column. For example, one of the split liquid streams may be fed into a gas oil side-stripper, a diesel side-stripper, or a kerosene side-stripper that feeds into the column.

In another alternative of the method described immediately above, following passing of the condensate into the column, rather than mixing the liquid stream from the first flash drum and the remaining vapor stream from the second flash drum, the remaining vapor stream from the second flash drum is cooled and fed into a third flash drum to further separate the remaining cooled vapor stream into a residual vapor stream and a residual liquid stream. The residual liquid stream is then fed into the column above the flash zone thereof, while the liquid stream separated from the crude oil in the first flash drum and the residual vapor stream separated from the remaining cooled vapor stream in the third flash drum are mixed to form a mixture that is then heated and fed into the flash zone of the column. In the final step, at least one of the naphtha stream, the kerosene stream, the diesel stream and the gas oil stream is selectively withdrawn from the column such that the yield of at least one of naphtha, kerosene, diesel and gas oil is increased and residue yield is decreased. In all of the embodiments described herein, a flash drum has been used as a means of separating mixtures. However, it is to be understood that any other method known in the art may be utilized to achieve the same or similar separation, and thus falls within the scope of the present invention.

While each of the embodiments described herein above is related to increasing yields of individual components of a mixture, such as increasing the yield of at least one of naphtha, kerosene, diesel and gas oil from crude oil, for example, it is to be understood that such embodiments may also be utilized to reduce energy consumption, even if the yield of individual components is not increased, and therefore decreasing energy consumption also falls within the scope of the methods of the present invention.

The embodiments of this invention are alternatives to traditional techniques for improving distillate yields such as inert gas injection or steam stripping, lowering the pressure of the flash zone or increasing the temperature of the crude entering the flash zone. In fact, these embodiments can be applied in addition to the aforementioned techniques, thereby resulting in larger improvements.

Before explaining any of the above embodiments of the invention in greater detail, it is to be understood that the invention is not limited in its application to the details of construction and the arrangement of the components or steps or methodologies set forth in the description or illustrated in the drawings. The invention is capable of other embodiments or of being practiced or carried out in various ways. Also, it is to be understood that the phraseology and terminology employed herein is for the purpose of description and should not be regarded as limiting.

The above-described embodiments of the methods of the present invention will now be described in more detail in relation to FIGS. 4–9.

Figure 4:
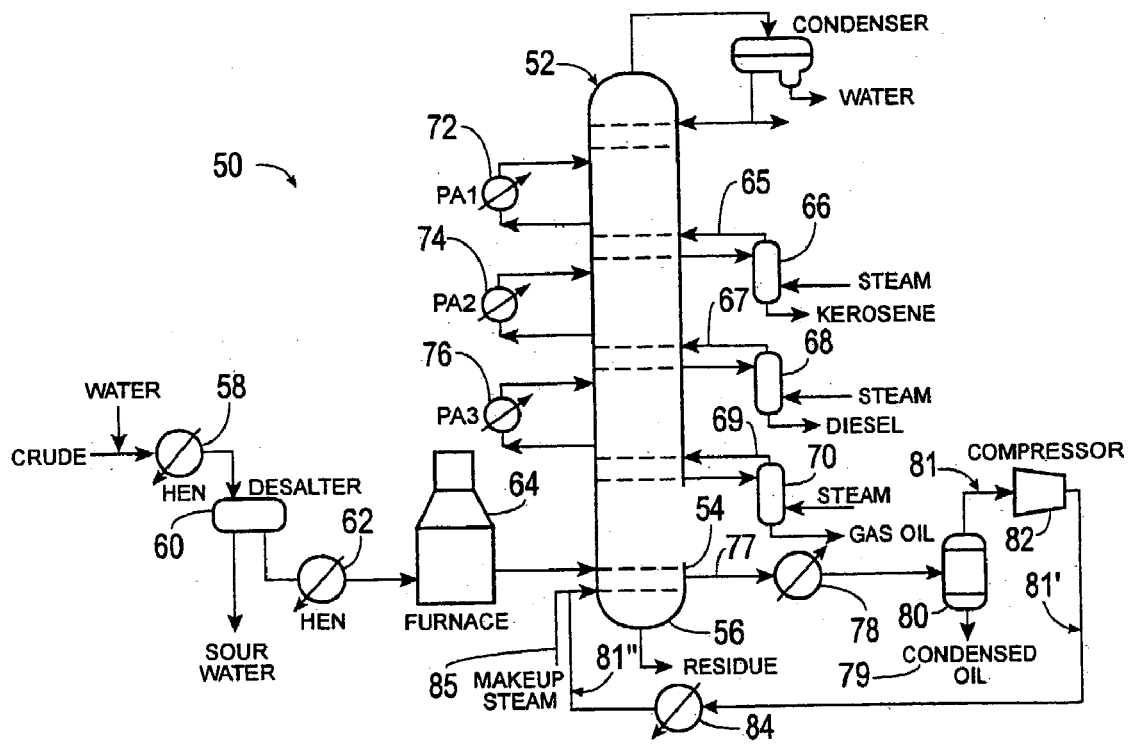
FIG. 4 is a schematic representation illustrating a crude oil separation method of the present invention utilizing a crude oil distillation unit having a steam recycling design constructed in accordance with the present invention.
Figure 5:
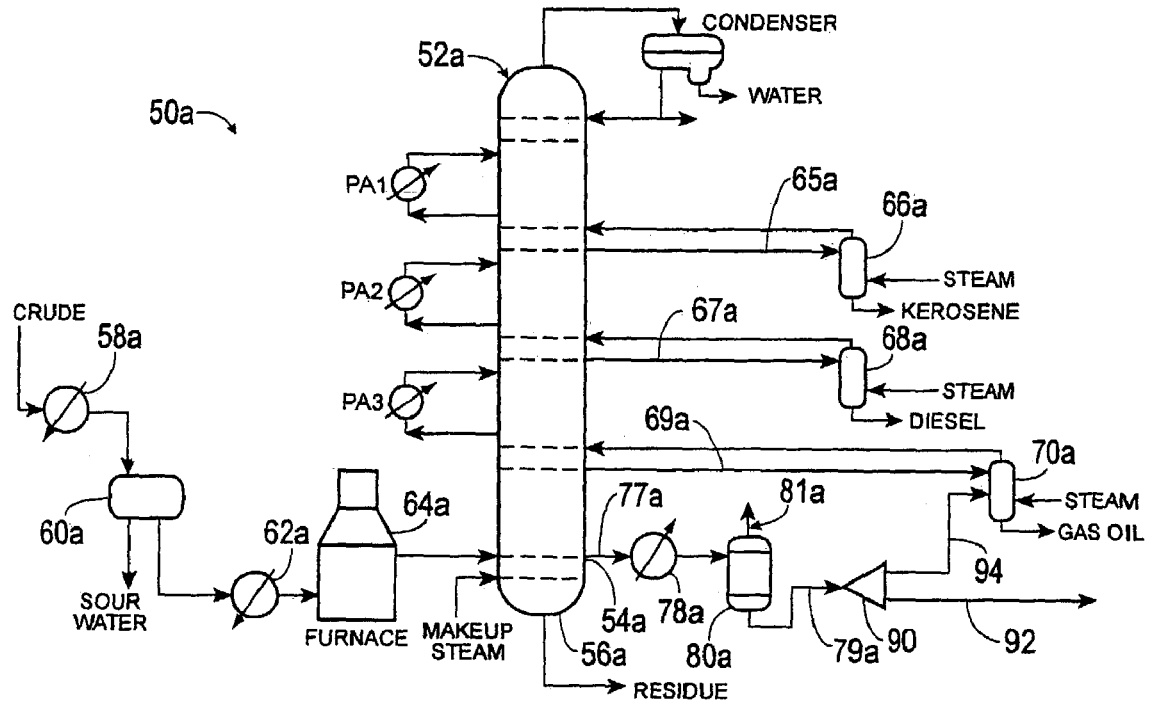
FIG. 5 is a schematic representation of another embodiment of a crude oil separation method of the present invention utilizing a crude oil distillation unit having a steam recycling design constructed in accordance with the present invention.
Figure 6:
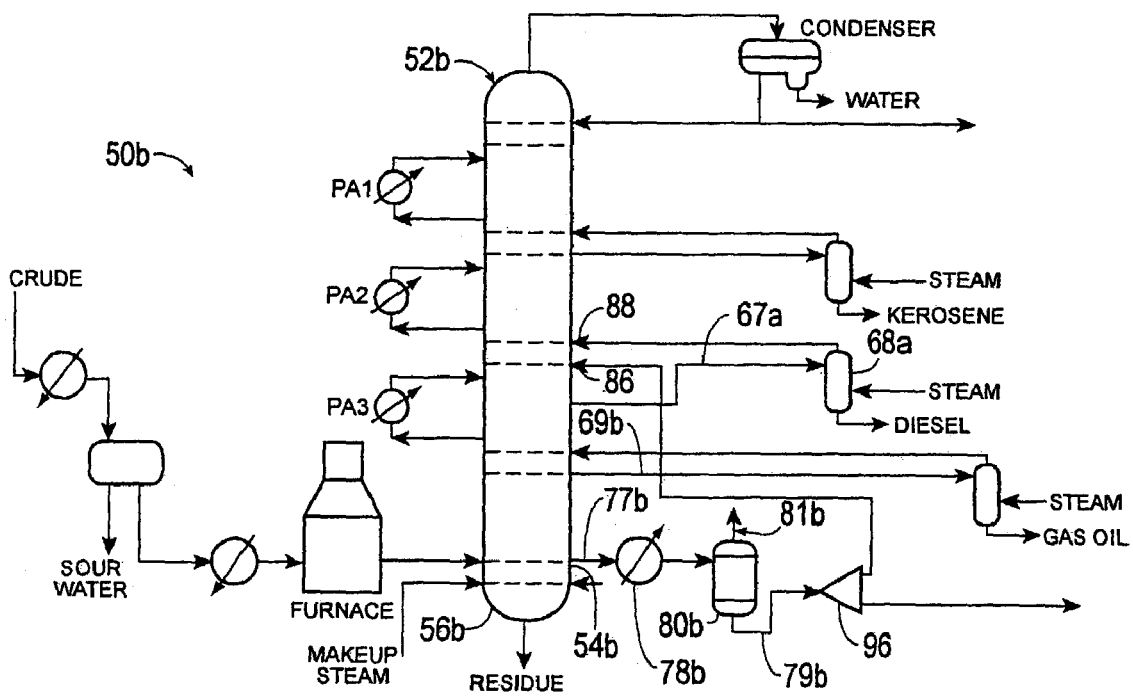
FIG. 6 is a schematic representation of yet another embodiment of a crude oil separation method of the present invention utilizing a crude oil distillation unit having a steam recycling design constructed in accordance with the present invention.

Description of FIGS. 4–6

Shown in FIG. 4 is one embodiment of a method of crude oil component separation of the present invention, which utilizes a steam recycling design crude oil distillation unit 50. The steam recycling design crude oil distillation unit 50 includes a distillation column 52 having a flash zone 54 and a bottom 56, a first HEN 58, a desalter 60, a second HEN 62, a furnace 64, a returning vapor stream 65 and a side-stripper 66 for removing kerosene from the distillation column 52, a returning vapor stream 67 and a side-stripper 68 for removing diesel from the distillation column 52, a returning vapor stream 69 and a side-stripper 70 for removing gas oil from the distillation column 52, and three pumparounds PA1 72, PA2 74 and PA3 76, which are provided in a similar configuration and function in a similar manner as in the conventional crude distillation unit 10 of FIGS. 1 and 2. The method of the present invention is unique in that a hydrocarbon-rich steam 77 is withdrawn from the crude oil distillation column 52 below the flash zone 54 thereof and heat exchanged with cold crude oil or other cold fluid in a cooler 78 to condense hydrocarbons, thereby producing condensed oil 79 and a vapor stream 81. The condensed oil 79 and vapor stream 81 are separated in a tank or drum 80. The condensed oil 79 may be used in this state, or it may be sent to a gas oil stripper (not shown) for further separation. The vapor stream 81 is passed through a compressor 82 to form vapor stream 81', and vapor stream 81' is heated in a heater 84 to form heated vapor stream 81", which is combined with a stream of make-up steam 85 and enters the bottom 56 of the distillation column 52 as a stripping steam, as shown in FIG. 4. Alternatively, the vapor stream 81 may be disposed of rather than sending it back to the column 52; this would eliminate the need for the compressor 82 and the heater 84 as well as the reinjection of stream 81" into the column.

It is to be understood that the method of the present invention is not limited to the use of the compressor 82 to compress the vapor stream 81 coming from the separator tank or drum 80 in the specific location illustrated in FIG. 4. The purpose of such compressor 82 is to facilitate the reinjection of the vapor stream 81 in the column 52 after passing through the heater 84, and therefore the compressor 82 may be positioned at any location that will allow the compressor 82 to function in accordance with the present invention. For example, the compressor 82 can also be located immediately after removal of the recirculating stream 77 from the column 52 and before injection thereof into the cooler 78.

It should be noted that the above-described invention is not limited to a method utilizing an atmospheric distillation unit, and that the steps of the method of the present invention can also be adapted for use in the separation of any other mixtures in a similar manner. It is within the skill of a person having ordinary skill in the art to utilize the method of the present invention with, for example but not by limitation, crude distillation, vacuum distillation, FCC main fractionation, and homogeneous organic mixture separation, wherein the mixtures include, but are not limited to, crude oil, synthetic crude oil, and vegetable oils, and wherein the separation may be, but not limited to, flashing or distillation.

While the above-described embodiment involves extraction of the steam rich stream 77 below the flash zone 54 of the distillation column 52, the steam rich stream 77 can be extracted at any position on the distillation column 52 above the flash zone 54 and still fall within the scope of the present invention.

The method of the present invention utilizing the steam recycling design crude oil distillation unit 50 results in a larger yield of gas-oil than the conventional or pre-flash design crude oil distillation units 10 and 10a of the prior art. The technology illustrated in FIG. 4 can also be adapted to accommodate product specification needs. Whether the condensed hydrocarbon-rich liquid 79 from drum 80 is sent to an independent stripper for conditioning or is injected into some of the trays of the column 52 or into one of the side strippers 66, 68 or 70 of the distillation column 52, the net result is an increase of gas-oil yield without a reduction of the yield of any other products.

It is to be understood that the method of the present invention is not limited to the use of steam as described herein above, and that any other compound which can function in accordance with the present invention may be utilized in the method of the present invention. It is within the skill of a person of ordinary skill in the art to select compounds that may be utilized in the method of the present invention, and therefore such compounds or mixtures thereof are within the scope of the present invention. For example, hydrogen, nitrogen, carbon dioxide, methane, ethane, ethylene, propane, combinations or mixtures thereof or the like may all be utilized in any of the methods of the present invention described herein.

The present invention relies on the injection of steam or any other light gas in the bottom of the column and extracting a vapor stream rich in hydrocarbons below or at the flash zone to recover the hydrocarbons from the vapor stream. While one embodiment has been described herein for recovering liquids and which illustrates the remaining vapor being recycled to the column, the invention is not limited to the recovery process described herein above, and other variants of the recovery process, whether requiring recycling or not, are within the scope of the method of the present invention. In addition, the embodiment described herein suggests that the condensed oil 79 can be sent to different places, such as back to a tray of the column 52 or to a side stripper, or that the condensed oil 79 can be further processed. Any variant of this arrangement also falls within the scope of the methods of the present invention.

Further, it is to be understood that the present invention also encompasses reinjection of the vapor stream 81 separated from the oil condensate 79 in drum 80 (FIG. 4) anywhere in the column 52, above or below the flash zone 54, as well as not reinjecting the vapor stream at all.

FIG. 5 illustrates another embodiment of the method of crude oil separation of the present invention. The embodiment of the method of the present invention shown in FIG. 5 utilizes a crude oil distillation unit 50a having a steam recycling design, which is constructed of similar components and in a similar manner as the steam recycling design crude oil distillation unit 50 illustrated in FIG. 4, except that in the steam recycling design crude oil distillation unit 50a, a vapor stream 77a is withdrawn from a flash zone 54a of a crude distillation column 52a and processed through a cooler 78a and a tank or drum 80a to separate and remove condensed oil 79a. The hydrocarbon-rich condensed oil 79a is then divided in a splitter 90, with one portion 92 being sent for further processing and the other portion 94 being injected into a side-stripper 70a rather than back into the distillation column 52a. In this case, the vapor 81a separated from the condensed oil 79a in the tank or drum 80a is not reinjected back into the column 52a but rather is either disposed of or processed elsewhere.

While FIG. 5 illustrates the injection of the portion 94 of the condensed oil 79a obtained from the vapor 77a from the flash zone 54a of the distillation column 52a into the side-stripper 70a, it is to be understood that the condensed oil 94 obtained from the vapor 77a from the flash zone 54a of the distillation column 52a could be injected into either of the other side-strippers 66a or 68a, or into one of the trays 65a, 67a or 69a, or into any other trays of the distillation column 52a, or into an independent side-stripper (not shown) for conditioning prior to recycling to the distillation column 52a. It should also be understood that the vapor 81a can be recycled to the column 52a in a similar manner as that shown for the vapor 81 in FIG. 4, with the variants being described herein before.

FIG. 6 illustrates yet another embodiment of the method of crude oil separation of the present invention utilizing a steam recycling design, in which the condensed oil obtained from the vapor stream from the flash is injected into other parts of the column. The embodiment of the method of the present invention shown in FIG. 6 utilizes a crude oil distillation unit 50b having a steam recycling design, which is constructed of similar components and in a similar manner as the steam recycling design crude oil distillation unit 50 illustrated in FIG. 4, except that in the steam recycling design crude oil distillation unit 50b, a vapor stream 77b is withdrawn from a flash zone 54b of a crude distillation column 52b and processed through a cooler 78b and a tank or drum 80b to separate and remove condensed oil 79b. The hydrocarbon-rich condensed oil 79b is then passed through a splitter 96 for separation into two portions wherein a first portion is sent for further processing and a second portion is injected into the distillation column 52b at a position 86. In this case, the vapor stream 81b separated from the condensed oil 79b in the tank 80b is not recycled to the column 52b but rather is either disposed of or processed elsewhere.

While the position 86 is illustrated in FIG. 6 as being located between a tray 67a and an injection site 88 from a side-stripper 68a, it is to be understood that the position 86 may be located anywhere on the distillation column 52b, and that the location of position 86 in FIG. 6 is provided for illustration purposes only.

The key step to the embodiments of the present invention described herein above with reference to FIGS. 4–6 is related to the withdrawal of vapor from the distillation column (either below or even above the flash zone) and the removal of heavy components from such vapor. In the embodiments described herein, this is accomplished by the use of a cooler and a drum or flash tank, from which the condensate of heavy hydrocarbons is obtained. In addition, the vapor is either recompressed and sent to the column, disposed of or processed elsewhere, while the condensate may be used as is or sent back to the column or to a side-stripper.

Thus, the core of the invention is the use of a carrier component (such as steam or any component known to those of ordinary skill in the art) below the flash zone and the removal of the vapor to separate heavy condensates from it. Any method of accomplishing this step may be utilized in the method of the present invention. In addition, while the embodiments described herein above involve the destination of the condensate oil being the main column or one of the side strippers, there are many other alternatives that also fall within the scope of the present invention. Such alternatives include, but are not limited to, splitting of the liquid stream to feed the main column at various locations, and the independent processing of the liquid stream all together.

Figure 7:
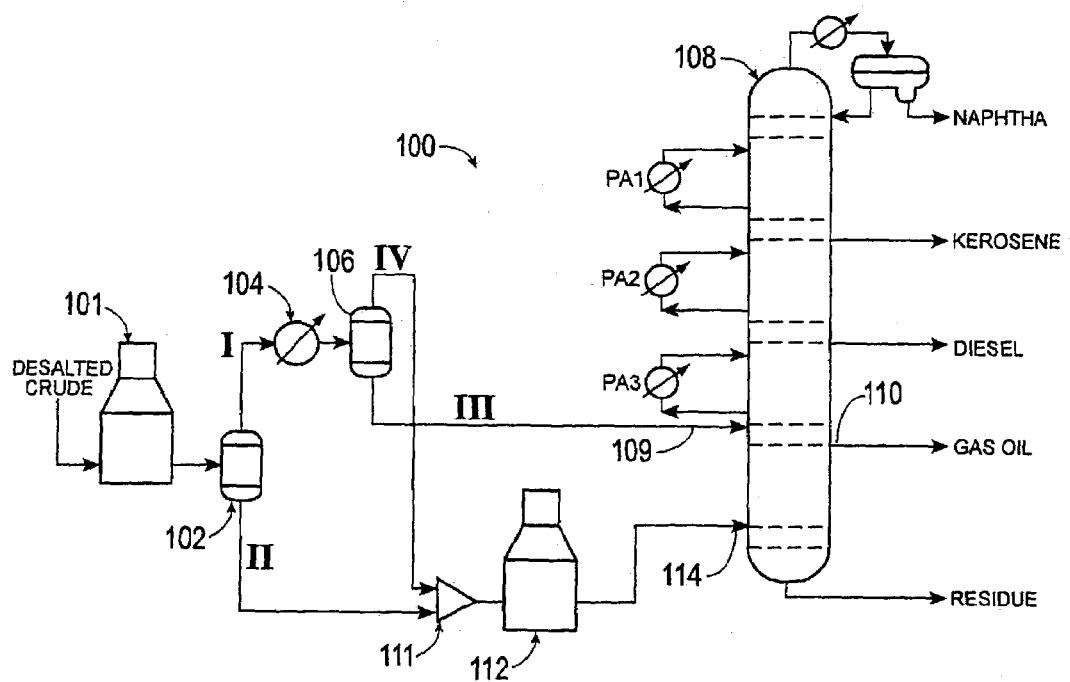
FIG. 7 is a schematic representation of yet another embodiment of a crude oil separation method of the present invention.
Figure 8:
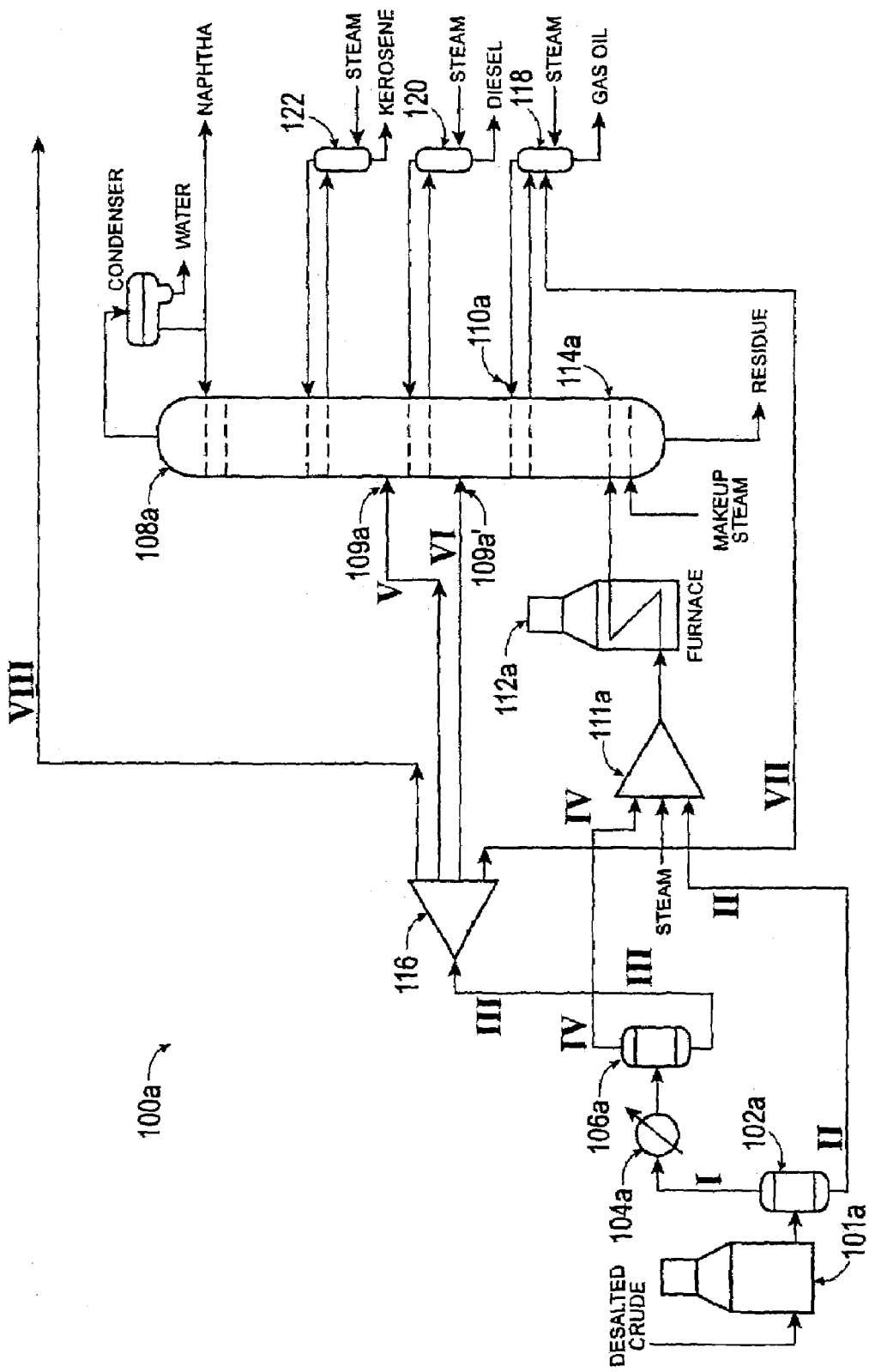
FIG. 8 is a schematic representation of yet another embodiment of a crude oil separation method of the present invention.
Figure 9:
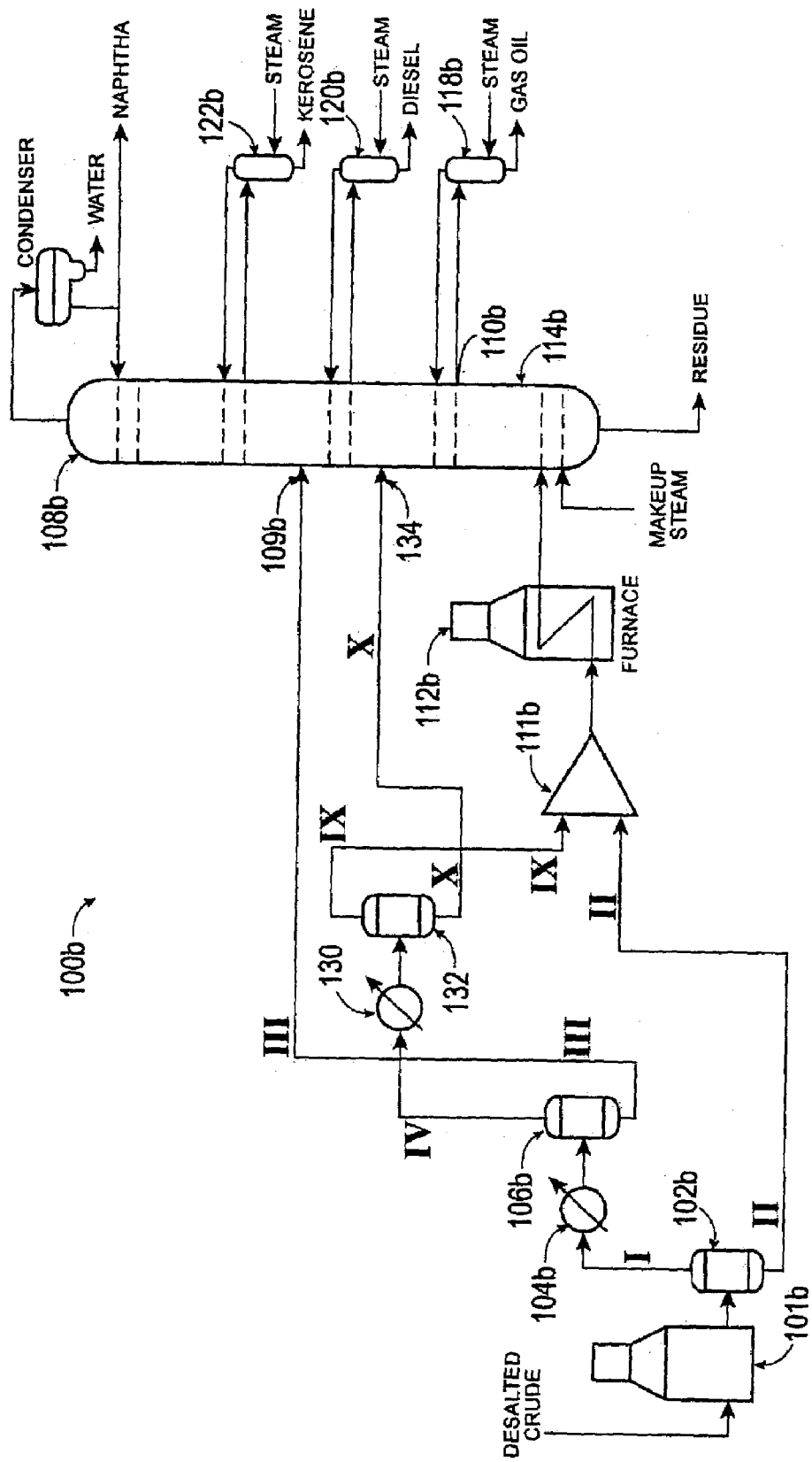
FIG. 9 is a schematic representation of yet another embodiment of a crude oil separation method of the present invention.

Description of FIGS. 7–9

Another aspect of the method of the present invention involves the removal of intermediate components of the crude oil from the flash zone feed. FIG. 7 illustrates one embodiment of such a method of crude oil separation of the present invention that utilizes the carrier effect of light crude components. The method utilizes a crude oil distillation unit 100, in which the crude oil is heated to a predetermined temperature in a furnace 101, where a portion of the crude oil vaporizes. The partially vaporized crude oil passes through a flash tank or drum 102, where vapor (I) and liquid (II) are separated. The vapor (I) is cooled in a cooler 104 and then enters another flash tank or drum 106, where the condensate (III) and the remaining vapor (IV) are separated. The condensate (III), consisting mostly of gas oil components, is sent to a main tower or atmospheric distillation column 108 at a tray 109 above a gas oil withdrawal tray 110; however, it is to be understood that the condensate (III) comprising the intermediate components may be sent to the column 108 at any position on the column, and the tray 109 is illustrated as being above the gas oil withdrawal try 110 for the purpose of illustration only. The remaining vapor (IV) is mixed with the liquid (II) in a mixer 111, and the mixture is heated in a furnace 112 before entering a flash zone 114 of the main tower 108. While the side strippers, heat exchanger networks and pumparounds have been omitted from FIG. 7 for the purpose of simplicity, it is within the skill of a person having ordinary skill in the art, given the present disclosure, to modify the crude oil distillation unit 100 to include side strippers and pumparounds (such as side strippers and pumparounds similar to those illustrated in FIGS. 1–4), and therefore such arrangement also falls within the scope of the present invention.

The method of the present invention takes advantage of the carrier effect of light components. The compositions of these components vary with the temperature chosen in the two flash tanks 102 and 106 and the crude oil. The temperatures used can be varied with different separation results. The separation of the intermediate components in the condensate (III) is responsible for the success of the method of the present invention. Whether the intermediate components are sent to the distillation column 108 or to side-strippers into different trays (not shown), or into other units is a matter of design choice that is within the skill of a person of ordinary skill in the art, and therefore such adaptations of the methods described herein are within the scope of the present invention.

Any other alternative to the two-flash arrangement described herein above with reference to FIG. 7 that can accomplish the separation of the intermediate components leaving a portion of lights mixed with the crude fed into the flash zone also falls within the scope of the method of the present invention. Such alternatives can comprise, for example, the use of multiple flashes and/or other separation units such as distillation columns to send different portions of intermediates to different locations.

Indeed, such alternatives include, but are not limited to, change of tray location for the feed of intermediates into the column or into the side stripper, splitting the feed of intermediates to feed various locations or simply use of the feed of intermediates in some other units, the use of more than one flash with alternative locations of the column feeds/side-strippers or possible use in other units, the use of distillation columns, and the like.

Shown in FIG. 8 is another embodiment of the method of crude oil separation of the present invention, which utilizes a crude oil distillation unit 100a. The crude oil distillation unit 100a is constructed from similar components and in a similar manner as the crude oil distillation unit 100 of FIG. 7, except as described in more detail herein below. In the crude oil distillation unit 100a, crude oil is heated to a predetermined temperature in a furnace 101a, and a portion of the crude oil vaporizes. The partially vaporized crude oil passes through a flash tank or drum 102a, where vapor (I) and liquid (II) are separated. The vapor (I) is cooled in a cooler 104a and then enters another flash tank or drum 106a, where the condensate (III) and the remaining vapor (IV) are separated. In the embodiment of the method of the present invention shown in FIG. 8, the condensate (III) is split in a splitter 116 into stream portions (V), (VI), (VII), and (VIII), and at least one of the stream portions (V), (VI), (VII), or (VIII) from the split condensate (III) is introduced into a main tower or atmospheric distillation column 108a at a position above a gas oil withdrawal tray 110a. In FIG. 8, stream portion (V) is introduced into the distillation column 108a through tray 109a at a position above the gas oil withdrawal tray 110a, while stream portion (VI) is introduced into the distillation column 108a through tray 109a' at a position above the gas oil withdrawal tray 110a. It is to be understood that the trays 109a and 109a' are illustrated as being located above the gas oil withdrawal tray 110a for the purposes of illustration only, and that the trays 109a and 109a' may be located at any position on the column 108a. Likewise, while the steam portion (VII) is illustrated as being sent to the gas oil side-stripper 118, it is to be understood that the steam portion may be introduced into any side stripper disclosed herein. FIG. 8 also illustrates the stream portion (VII) being introduced into a gas-oil side stripper 118, while stream portion (VIII) is illustrated as being sent elsewhere for further processing.

The remaining vapor (IV) from the flash tank 106a is mixed with the liquid (II) from the flash tank 102a in a mixer 111a, and the mixture is heated in a furnace 112a before entering a flash zone 114a of the distillation column 108a.

Shown in FIG. 9 is yet another embodiment of the method of crude oil separation of the present invention, which utilizes a crude oil distillation unit 10b. The crude oil distillation unit 100b is constructed from similar components and in a similar manner as the crude oil distillation unit 100 of FIG. 7, except as described in more detail herein below. In the crude oil distillation unit 100b, crude oil is heated to a predetermined temperature in a furnace 101b, and a portion of the crude oil vaporizes. The partially vaporized crude oil passes through a flash tank or drum 102b, where vapor (I) and liquid (II) are separated. The vapor (I) is cooled in a cooler 104b and then enters another flash tank or drum 106b, where the condensate (III) and the remaining vapor (IV) are separated. The condensate (III) is introduced into a distillation column 108b at a tray 109b at a position above a gas oil withdrawal tray 110b. The remaining vapor (IV) is cooled in a cooler 130 and then enters yet another flash tank or drum 132, where vapor (IX) and liquid (X) fractions are separated. The liquid fraction (X) then enters the distillation column 108b at a tray 134 above the gas oil withdrawal tray 110b. The remaining vapor fraction (IX) from the flash tank 132 is mixed with the liquid (II) from the flash tank 102b in a mixer 111b, and the mixture is heated in a furnace 112b before entering a flash zone 114b of the main tower 108b. Variations of this process include providing multiple flashes or other units, changing the feed trays of liquid streams (II) and (X), and the like.

The key step to the embodiments of the present invention described herein above with reference to FIGS. 7–9 is related to the separation from the feed crude oil of components of intermediate molecular weight, such as components in the boiling point range of, but not limited to, diesel or gas oil, leaving the very heavy and very light portions together and injecting such mixture in the flash zone of the column. The removal of components of intermediate molecular weight allows a larger portion of the crude oil to vaporize in the flash zone of the main crude tower. In the embodiments described herein, this is accomplished by the use of two or more flash drums and their corresponding furnaces or coolers. However, any method of accomplishing this step may be utilized in the method of the present invention. The flash drum can also be replaced by any other separation equipment known in the art that is capable of separating the feed into two streams: one rich in light components and the other rich in heavy components. An example of such equipment that may be utilized in such a manner is a column with several trays. The stream temperature at the outlet of the cooler (such as cooler 104 in FIG. 7) is such that the vapor (I) entering the cooler 104 is partially condensed. In addition, the flashing/cooling process can be repeated and therefore is not limited to one flash drum followed by one cooler, such as the flash drum 102 followed by the cooler 104, as shown in FIG. 7.

The separation of intermediate components can also be accomplished by other methods such as, but not limited to, distillation, absorption, adsorption, membrane separation and combinations thereof.

In addition, while the embodiments provided herein above describe the destination of the intermediate components as being the main column, there are many other alternatives that also fall within the scope of the present invention. Such alternatives include, but are not limited to, splitting of the liquid streams to feed the main column at various locations, and the independent processing of the liquid streams all together.

While each of the embodiments described herein and illustrated in the drawings includes elements utilized in varying the temperature of a stream, for example, heat exchangers, furnaces, heaters and coolers, it is to be understood that any element that varies the temperature of the contents contained therein may be utilized in the methods of the present invention, and that such methods are not limited to the specific elements described herein and illustrated in the drawings. For example, the term "heater" may be used to describe a furnace, a heat exchanger, or a combination of the two, and such terms may be used interchangeably herein. Therefore, while a furnace may be illustrated in the figures, it is to be understood that a heat exchanger or a combination of a furnace and a heat exchanger, or any other form of heater known in the art may be substituted for the furnace illustrated herein and still fall within the scope of the present invention.

While the methods of the present invention have been described herein with respect to crude oil atmospheric distillation columns, it will be understood that the methods of the present invention are not limited to such use but can also be used to improve the yield of distillates in crude oil vacuum columns or any other separations of mixtures in a similar manner, and it is within the skill of a person having ordinary skill in the art to recognize the separations to which the methods of the present invention can be applied and to adapt the methods of the present invention for use in such separations, which include, but are not limited to, crude distillation, vacuum distillation, FCC main fractionation, and homogeneous organic mixture separation, wherein the mixtures include, but are not limited to, crude oil, synthetic crude oil, and vegetable oils, and wherein the separation may be, but not limited to, flashing or distillation.

Changes may be made in the construction and the operation of the various components, elements and assemblies described herein or in the steps or the sequence of steps of the methods described herein without departing from the spirit and scope of the invention as defined in the following claims.

What is claimed is:

1. A method of separating components of a mixture comprising:
   providing a mixture comprising at least one first component, at least one second component and at least one intermediate component;
   heating the mixture to a temperature sufficient to permit separation of the mixture into a first stream rich in the at least one first component and a second stream rich in the at least one intermediate component upon passage through a column, thereby leaving a heavy residue in a bottom of the column, wherein the heavy residue is rich in the at least one second component;
   feeding the heated mixture to a column having a flash zone;
   withdrawing a vapor stream from the column at a position below the flash zone of the column;
   separating the vapor stream into a condensate and a resultant vapor stream; and
   recycling at least one of the resultant vapor stream and the condensate to the column; and
   selectively withdrawing at least one of the first stream rich in the at least one first component and the second stream rich in the at least one intermediate component from the column such that the yield of at least one of the at least one first component and the at least one intermediate components component is increased and the yield of residue is decreased.

2. The method of claim 1 wherein, in the step of feeding the heated mixture to a column, the column is an atmospheric column or a vacuum column.

3. The method of claim 1 wherein, in the step of recycling at least one of the resultant vapor stream and the condensate to the column, at least the resultant vapor stream is recycled to the column, and the method further comprises the step of recompressing the resultant vapor stream prior to recycling the vapor stream to the column.

4. The method of claim 1 wherein, in the step of recycling at least one of the resultant vapor stream and the condensate to the column, at least the resultant vapor stream is recycled to the column at a location below the position where the resultant vapor stream was withdrawn from the column, and the method further comprises the step of heating the resultant vapor stream prior to recycling the vapor stream to the column.

5. The method of claim 1 wherein, in the step of recycling at least one of the resultant vapor stream and the condensate to the column, the condensate is fed into a side stripper that feeds into the column.

6. The method of claim 1 wherein the step of separating the vapor stream into a condensate and a resultant vapor stream is further defined as cooling the vapor stream to form a condensate and separating the resultant vapor stream from the condensate.

7. A method of separating components of crude oil comprising:
   providing crude oil comprising naphtha, kerosene, diesel, gas oil and residue;
   heating the crude oil to a temperature sufficient to permit separation of the crude oil into a naphtha stream, a kerosene stream, a diesel stream and a gas oil stream upon passage through a column;
   feeding the heated crude oil to a column having a flash zone;
   withdrawing a vapor stream from the column at a position below the flash zone of the column;
   separating the vapor stream into a condensate and a resultant vapor stream;
   recycling the resultant vapor stream to the column; and
   selectively withdrawing at least one of the naphtha stream, the kerosene stream, the diesel stream and the gas oil stream from the column such that the yield of at least one of naphtha, kerosene, diesel and gas oil is increased and the yield of residue is decreased.

8. The method of claim 7 wherein, in the step of feeding heated crude oil to a column, the column is a distillation column.

9. The method of claim 7 wherein, in the step of feeding heated crude oil to a column, the column is a vacuum column.

10. The method of claim 7 further comprising the step of recompressing the resultant vapor stream prior to recycling the vapor stream to the column.

11. The method of claim 7 further comprising the step of heating the resultant vapor stream prior to recycling the vapor stream to the column.

12. The method of claim 7 further comprising the step of recycling the condensate to the column.

13. The method of claim 7 further comprising the step of recycling the condensate into a side stripper that feeds into the column.

14. The method of claim 7 further comprising the step of utilizing the condensate as condensed oil.

15. The method of claim 7 wherein the step of separating the vapor stream into a condensate and a resultant vapor stream is further defined as cooling the vapor stream to form a condensate and separating the resultant vapor stream from the condensate.

16. A method of separating components of crude oil comprising:
   providing crude oil comprising naphtha, kerosene, diesel, gas oil and residue;
   heating the crude oil to a temperature sufficient to permit separation of the crude oil into a naphtha stream, a kerosene stream, a diesel stream and a gas oil stream upon passage through a column;
   feeding the heated crude oil to a column having a flash zone;
   withdrawing a vapor stream from the column at a position below the flash zone of the column;

separating the vapor stream into a condensate and a resultant vapor stream;

recycling the condensate to the column; and selectively withdrawing at least one of the naphtha stream, the kerosene stream, the diesel stream and the gas oil stream from the column such that the yield of at least one of naphtha, kerosene, diesel and gas oil is increased and the yield of residue is decreased.

17. The method of claim 16 wherein, in the step of feeding heated crude oil to a column, the column is a distillation column.

18. The method of claim 16 wherein, in the step of feeding heated crude oil to a column, the column is a vacuum column.

19. The method of claim 16 further comprising the step of disposing of the resultant vapor stream.

20. The method of claim 16 further comprising the step of further processing the resultant vapor stream.

21. The method of claim 16 wherein the step of recycling the condensate of heavy components to the column is further defined as feeding the condensate into a side stripper that feeds into the column.

22. The method of claim 16 wherein the step of separating the vapor stream into a condensate and a resultant vapor stream is further defined as cooling the vapor stream to form a condensate and separating the resultant vapor stream from the condensate.

23. A method of separating components of a mixture comprising:

providing an initial mixture comprising at least one individual component having light molecular weight and/or low boiling point, at least one individual component having intermediate molecular weight and/or intermediate boiling point, and at least one individual component having heavy molecular weight and/or high boiling point;

separating the initial mixture into a first stream composed substantially of intermediate molecular weight and/or intermediate boiling point components and a second stream composed substantially of light molecular weight and/or low boiling point and heavy molecular weight and/or high boiling point components;

feeding the second stream into a flash zone of a column capable of separating the initial mixture into at least one light molecular weight and/or low boiling point component stream, at least one intermediate molecular weight and/or intermediate boiling point component stream and at least one heavy molecular weight and/or high boiling point component stream, wherein the second stream is substantially free of intermediate molecular weight and/or intermediate boiling point components, thereby utilizing a carrier effect of light molecular weight and/or low boiling point components such that a larger portion of the heavy molecular weight and/or high boiling point components are vaporized in the flash zone of the column; and selectively withdrawing at least one light molecular weight and/or low boiling point component stream, at least one intermediate molecular weight and/or intermediate boiling point component stream or at least one heavy molecular weight and/or high boiling point component stream from the column such that the yield of individual components of the initial mixture is increased.

24. The method of claim 23 further comprising the step of feeding the first stream composed substantially of intermediate molecular weight and/or intermediate boiling point components into the column at a different location than the location at which the second stream is fed into the column.

25. The method of claim 23 wherein, in the step of providing an initial mixture, the initial mixture is crude oil.

26. The method of claim 23 wherein, in the step of feeding the second stream into the column, the column is a distillation column.

27. The method of claim 23 wherein, in the step of feeding the second stream into the column, the column is a vacuum column.

28. The method of claim 23 wherein, in the step of providing an initial mixture, the initial mixture includes at least two individual components having light molecular weight and/or low boiling point, and wherein the step of selectively withdrawing at least one light molecular weight and/or low boiling point component stream is further defined as selectively withdrawing at least a first light molecular weight and/or low boiling point component stream and a second light molecular weight and/or low boiling point component stream.

29. The method of claim 23 wherein, in the step of providing an initial mixture, the initial mixture includes at least two individual components having intermediate molecular weight and/or intermediate boiling point, and wherein the step of selectively withdrawing at least one intermediate molecular weight and/or intermediate boiling point component stream is further defined as selectively withdrawing at least a first intermediate molecular weight and/or intermediate boiling point component stream and a second intermediate molecular weight and/or intermediate boiling point component stream.

30. The method of claim 23 wherein, in the step of providing an initial mixture, the initial mixture includes at least two individual components having heavy molecular weight and/or high boiling point, and wherein the step of selectively withdrawing at least one heavy molecular weight and/or high boiling point component stream is further defined as selectively withdrawing at least a first heavy molecular weight and/or high boiling point component stream and a second heavy molecular weight and/or high boiling point component stream.

31. A method of separating components of a mixture comprising:

providing an initial mixture comprising at least one individual component having light molecular weight and/or low boiling point, at least one individual component having intermediate molecular weight and/or intermediate boiling point, and at least one individual component having heavy molecular weight and/or high boiling point;

separating the initial mixture into a first stream rich in light molecular weight and/or low boiling point components, a second stream rich in heavy molecular weight and/or high boiling point components and a third stream rich in intermediate molecular weight and/or intermediate boiling point components;

feeding the first, second and third streams into a column such that the first stream is fed into a first position on the column, the second stream is fed into a second position on the column, and the third stream is fed into a third position on the column, wherein the first and second positions are in a flash zone of the column, and wherein the third position is in a location different from the flash zone of the column, thereby utilizing a carrier effect of light molecular weight and/or low boiling point components such that a larger portion of the heavy molecular weight and/or high boiling point components are vaporized in the flash zone of the column, and wherein the column is capable of separating the initial mixture into at least one stream composed substantially of one individual light molecular weight and/or low boiling point component, at least one stream composed substantially of one individual intermediate molecular weight and/or intermediate boiling point component and at least one stream composed substantially of one individual heavy molecular weight and/or high boiling point component; and selectively withdrawing at least one individual light molecular weight and/or low boiling point component stream, at least one individual intermediate molecular weight and/or intermediate boiling point component stream or at least one individual heavy molecular weight and/or high boiling point component stream from the column such that the yield of individual components of the initial mixture is increased.

32. The method of claim 31 wherein, in the step of providing a mixture, the mixture is crude oil.

33. The method of claim 31 wherein, in the step of feeding the first, second and third streams into a column, the column is a distillation column.

34. The method of claim 31 wherein, in the step of feeding the first, second and third streams into a column, the column is a vacuum column.

35. A method of separating components of a crude oil comprising:
providing a crude oil comprising naphtha, kerosene, diesel, gas oil and residue;
separating the crude oil into a first stream composed substantially of intermediate molecular weight and/or intermediate boiling point components and a second stream composed substantially of light molecular weight and/or low boiling point and heavy molecular weight and/or high boiling point components;
feeding the second stream into a flash zone of a column capable of separating the crude oil into a naphtha stream, a kerosene stream, a diesel stream and a gas oil stream, wherein the second stream is substantially free of intermediate molecular weight and/or intermediate boiling point components, thereby utilizing a carrier effect of light molecular weight and/or low boiling point components such that a larger portion of the heavy molecular weight and/or high boiling point components are vaporized in the flash zone of the column; and
selectively withdrawing at least one of the naphtha stream, the kerosene stream, the diesel stream and the gas oil stream such that the yield of at least one of naphtha, kerosene, diesel and gas oil is increased and the yield of residue is decreased.

36. The method of claim 35 further comprising the step of feeding the first stream into the column at a different location than a location at which the second stream is fed into the column.

37. The method of claim 35 wherein, in the step of feeding the second stream into a column, the column is a distillation column.

38. The method of claim 35 wherein, in the step of feeding the second stream into a column, the column is a vacuum column.

39. A method of separating components of a mixture comprising:
providing a crude oil comprising naphtha, kerosene, diesel, gas oil and residue;
separating the crude oil into a first stream rich in low molecular weight and/or low boiling point components, a second stream rich in heavy molecular weight and/or high boiling point components, and a third stream rich in intermediate molecular weight and/or intermediate boiling point components;
feeding the first, second and third streams into a column such that the first stream is fed into a first position on the column, the second stream is fed into a second position on the column, and the third stream is fed into a third position on the column, wherein the first and second positions are in a flash zone of the column, and wherein the third position is in a location different from the flash zone of the column, thereby utilizing a carrier effect of light molecular weight and/or low boiling point components such that a larger portion of the heavy molecular weight and/or high boiling point components are vaporized in the flash zone of the column, and wherein the column is capable of separating the crude oil into a naphtha stream, a kerosene stream, a diesel stream and a gas oil stream; and
selectively withdrawing at least one of the naphtha stream, the kerosene stream, the diesel stream and the gas oil stream from the column such that the yield of at least one of naphtha, kerosene, diesel and gas oil is increased and the yield of residue is decreased.

40. The method of claim 39 wherein, in the step of feeding the first, second and third streams into the column, the column is a distillation column.

41. The method of claim 39 wherein, in the step of feeding the first, second and third streams into the column, the column is a vacuum column.

42. A method of separating components of crude oil comprising:
providing crude oil comprising naphtha, kerosene, diesel, gas oil and residue;
heating the crude oil to a temperature sufficient to permit separation of the crude oil into a vapor stream and a liquid stream;
feeding the heated crude oil to a first flash drum and separating the crude oil into the vapor stream and the liquid stream;
cooling the vapor stream and feeding the cooled vapor stream to a second flash drum to separate the vapor stream into condensate and a remaining vapor stream, wherein the condensate comprises gas oil components and the remaining vapor stream comprises light components;
feeding the condensate into a distillation column whereby the column is capable of separating the crude oil into a naphtha stream, a kerosene stream, a diesel stream and a gas oil stream, the condensate being fed into the distillation column above a flash zone of the distillation column;
mixing the liquid stream from the first flash drum and the remaining vapor stream from the second flash drum to provide a mixture and heating the mixture;
feeding the mixture into the flash zone of the distillation column; and
selectively withdrawing at least one of the naphtha stream, the kerosene stream, the diesel stream and the gas oil stream from the column such that the yield of at least one of naphtha, kerosene, diesel and gas oil is increased and residue yield is decreased.

43. The method of claim 42 further comprising the step of splitting the condensate from the second flash drum into at least two liquid streams prior to feeding the condensate into the distillation column such that the at least two split liquid streams containing intermediate components are fed into the distillation column at different locations of the distillation column.

44. The method of claim 43 wherein at least one of the split liquid streams is fed into a side-stripper of the distillation column.

45. The method of claim 44 wherein the side-stripper is a gas oil side-stripper.

46. The method of claim 44 wherein the side-stripper is a diesel side-stripper.

47. The method of claim 44 wherein the side-stripper is a kerosene side-stripper.

48. A method of separating components of crude oil comprising:
providing crude oil comprising naphtha, kerosene, diesel, gas oil and residue;
heating the crude oil to a temperature sufficient to permit separation of the crude oil into a vapor stream and a liquid stream;
feeding the heated crude oil to a first flash drum and separating the crude oil into the vapor stream and the liquid stream;
cooling the vapor stream and feeding the cooled vapor stream to a second flash drum to separate the vapor stream into condensate and a remaining vapor stream, wherein the condensate comprises gas oil components and the remaining vapor stream comprises light components;
feeding the condensate into a distillation column whereby the column is capable of separating the crude oil into a naphtha stream, a kerosene stream, a diesel stream and a gas oil stream, the condensate being fed into the distillation column above a flash zone of the column;
cooling the remaining vapor stream from the second flash drum and feeding the cooled remaining vapor stream to a third flash drum to further separate the cooled remaining vapor stream into a residual vapor stream and a residual liquid stream;
feeding the residual liquid stream from the third flash drum into the distillation column above the flash zone of the column;
mixing the liquid stream from the first flash drum and the residual vapor stream from the third flash drum to form a mixture and heating the mixture;
feeding the mixture into the flash zone of the distillation column; and
selectively withdrawing at least one of the naphtha stream, the kerosene stream, the diesel stream and the gas oil stream such that the yield of at least one of naphtha, kerosene, diesel and gas oil is increased and residue yield is decreased.

49. A method of separating components of a mixture comprising:
providing a mixture comprising at least a first component, a second component and an intermediate component;
heating the mixture to a temperature sufficient to permit separation of the mixture into a first stream rich in the first component and a second stream rich in the intermediate component upon passage through a column, thereby leaving a heavy residue in a bottom of the column, wherein the heavy residue is rich in the second component;
feeding the heated mixture to a column having a flash zone;
withdrawing a vapor stream from the column at a position below the flash zone of the column;
separating the vapor stream into a condensate and a resultant vapor stream; and
recycling at least one of the resultant vapor stream and the condensate to the column; and
selectively withdrawing at least one of the first stream rich in the first component and the second stream rich in the intermediate component from the column such that energy consumption is decreased.

50. A method of separating components of crude oil comprising:
providing crude oil comprising naphtha, kerosene, diesel, gas oil and residue;
heating the crude oil to a temperature sufficient to permit separation of the crude oil into a naphtha stream, a kerosene stream, a diesel stream and a gas oil stream upon passage through a column;
feeding the heated crude oil to a column having a flash zone;
withdrawing a vapor stream from the column at a position below the flash zone of the column;
separating the vapor stream into a condensate and a resultant vapor stream;
recycling the resultant vapor stream to the column; and
selectively withdrawing at least one of the naphtha stream, the kerosene stream, the diesel stream and the gas oil stream from the column such that energy consumption is decreased.

51. A method of separating components of crude oil comprising:
providing crude oil comprising naphtha, kerosene, diesel, gas oil and residue;
heating the crude oil to a temperature sufficient to permit separation of the crude oil into a naphtha stream, a kerosene stream, a diesel stream and a gas oil stream upon passage through a column;
feeding the heated crude oil to a column having a flash zone;
withdrawing a vapor stream from the column at a position below the flash zone of the column;
separating the vapor stream into a condensate and a resultant vapor stream;
recycling the condensate of heavy components to the column; and
selectively withdrawing at least one of the naphtha stream, the kerosene stream, the diesel stream and the gas oil stream from the column such that energy consumption is decreased.

52. A method of separating components of a mixture comprising:
providing an initial mixture comprising at least one individual component having light molecular weight and/or low boiling point, at least one individual component having intermediate molecular weight and/or intermediate boiling point, and at least one individual component having heavy molecular weight and/or high boiling point;
separating the initial mixture into a first stream composed substantially of intermediate molecular weight and/or intermediate boiling point components and a second stream composed substantially of light molecular weight and/or low boiling point and heavy molecular weight and/or high boiling point components;
feeding the second stream into a flash zone of a column capable of separating the initial mixture into at least one light molecular weight and/or low boiling point component stream, at least one intermediate molecular weight and/or intermediate boiling point component stream and at least one heavy molecular weight and/or high boiling point component stream, wherein the second stream is substantially free of intermediate molecular weight and/or intermediate boiling point components, thereby utilizing a carrier effect of light molecular weight and/or low boiling point components such that a larger portion of the heavy molecular weight and/or high boiling point components are vaporized in the flash zone of the column; and selectively withdrawing at least one light molecular weight and/or low boiling point component stream, at least one intermediate molecular weight and/or intermediate boiling point component stream or at least one heavy molecular weight and/or high boiling point component stream from the column such that energy consumption is decreased.

53. A method of separating components of a mixture comprising:

providing an initial mixture comprising at least one individual component having light molecular weight and/or low boiling point, at least one individual component having intermediate molecular weight and/or intermediate boiling point, and at least one individual component having heavy molecular weight and/or high boiling point;

separating the initial mixture into a first stream rich in light molecular weight and/or low boiling point components, a second stream rich in heavy molecular weight and/or high boiling point components and a third stream rich in intermediate molecular weight and/or intermediate boiling point components;

feeding the first, second and third streams into a column such that the first stream is fed into a first position on the column, the second stream is fed into a second position on the column, and the third stream is fed into a third position on the column, wherein the first and second positions are in a flash zone of the column, and wherein the third position is in a location different from the flash zone of the column, thereby utilizing a carrier effect of light molecular weight and/or low boiling point components such that a larger portion of the heavy molecular weight and/or high boiling point components are vaporized in the flash zone of the column, and wherein the column is capable of separating the initial mixture into at least one stream composed substantially of one individual light molecular weight and/or low boiling point component, at least one stream composed substantially of one individual intermediate molecular weight and/or intermediate boiling point component and at least one stream composed substantially of one individual heavy molecular weight and/or high boiling point component; and selectively withdrawing at least one individual light molecular weight and/or low boiling point component stream, at least one individual intermediate molecular weight and/or intermediate boiling point component stream or at least one individual heavy molecular weight and/or high boiling point component stream from the column such that energy consumption is decreased.

54. A method of separating components of a crude oil comprising:

providing a crude oil comprising naphtha, kerosene, diesel, gas oil and residue;

separating the crude oil into a first stream composed substantially of intermediate molecular weight and/or intermediate boiling point components and a second stream composed substantially of light molecular weight and/or light boiling point and heavy molecular weight and/or high boiling point components;

feeding the second stream into a flash zone of a column capable of separating the crude oil into a naphtha stream, a kerosene stream, a diesel stream and a gas oil stream, wherein the second stream is substantially free of intermediate molecular weight and/or intermediate boiling point components, thereby utilizing a carrier effect of light molecular weight and/or low boiling point components such that a larger portion of the heavy molecular weight and/or high boiling point components are vaporized in the flash zone of the column; and selectively withdrawing at least one of the naphtha stream, the kerosene stream, the diesel stream and the gas oil stream such that energy consumption is decreased.

55. A method of separating components of a mixture comprising:

providing a crude oil comprising naphtha, kerosene, diesel, gas oil and residue;

separating the crude oil into a first stream rich in low molecular weight and/or low boiling point components, a second stream rich in heavy molecular weight and/or high boiling point components, and a third stream rich in intermediate molecular weight and/or intermediate boiling point components;

feeding the first, second and third streams into a column such that the first stream is fed into a first position on the column, the second stream is fed into a second position on the column, and the third stream is fed into a third position on the column, wherein the first and second positions are in a flash zone of the column, and wherein the third position is in a location different from the flash zone of the column, thereby utilizing a carrier effect of light molecular weight and/or low boiling point components such that a larger portion of the heavy molecular weight and/or high boiling point components are vaporized in the flash zone of the column, and wherein the column is capable of separating the crude oil into a naphtha stream, a kerosene stream, a diesel stream and a gas oil stream; and selectively withdrawing at least one of the naphtha stream, the kerosene stream, the diesel stream and the gas oil stream from the column such that energy consumption is decreased.

56. A method of separating components of crude oil comprising:

providing crude oil comprising naphtha, kerosene, diesel, gas oil and residue;

heating the crude oil to a temperature sufficient to permit separation of the crude oil into a vapor stream and a liquid stream;

feeding the heated crude oil to a first flash drum and separating the crude oil into the vapor stream and the liquid stream;

cooling the vapor stream and feeding the cooled vapor stream to a second flash drum to separate the vapor stream into condensate and a remaining vapor stream, wherein the condensate comprises gas oil components and the remaining vapor stream comprises light components;

feeding the condensate into a distillation column whereby the column is capable of separating the crude oil into a naphtha stream, a kerosene stream, a diesel stream and a gas oil stream, the condensate being fed into the distillation column above a flash zone of the distillation column;

mixing the liquid stream from the first flash drum and the remaining vapor stream from the second flash drum to provide a mixture and heating the mixture;

feeding the mixture into the flash zone of the distillation column; and selectively withdrawing at least one of the naphtha stream, the kerosene stream, the diesel stream and the gas oil stream from the column such that energy consumption is decreased.

57. A method of separating components of crude oil comprising:

providing crude oil comprising naphtha, kerosene, diesel, gas oil and residue;

heating the crude oil to a temperature sufficient to permit separation of the crude oil into a vapor stream and a liquid stream;

feeding the heated crude oil to a first flash drum and separating the crude oil into the vapor stream and the liquid stream;

cooling the vapor stream and feeding the cooled vapor stream to a second flash drum to separate the vapor stream into condensate and a remaining vapor stream, wherein the condensate comprises gas oil components and the remaining vapor stream comprises light components;

feeding the condensate into a distillation column whereby the column is capable of separating the crude oil into a naphtha stream, a kerosene stream, a diesel stream and a gas oil stream, the condensate being fed into the distillation column above a flash zone of the column;

cooling the remaining vapor stream from the second flash drum and feeding the cooled remaining vapor stream to a third flash drum to further separate the cooled remaining vapor stream into a residual vapor stream and a residual liquid stream;

feeding the residual liquid stream from the third flash drum into the distillation column above the flash zone of the column;

mixing the liquid stream from the first flash drum and the residual vapor stream from the third flash drum to form a mixture and heating the mixture;

feeding the mixture into the flash zone of the distillation column; and selectively withdrawing at least one of the naphtha stream, the kerosene stream, the diesel stream and the gas oil stream such that energy consumption is decreased.

* * * * *

UNITED STATES PATENT AND TRADEMARK OFFICE
CERTIFICATE OF CORRECTION

PATENT NO. : 7,172,686 B1  
APPLICATION NO. : 10/387171  
DATED : February 6, 2007  
INVENTOR(S) : Shuncheng Ji and Miguel J. Bagajewicz Page 1 of 1

It is certified that error appears in the above-identified patent and that said Letters Patent is hereby corrected as shown below:

In the Claims:  
Column 15, line 49: After the word "intermediate" and before the word "component," please delete the word "components".

Signed and Sealed this

Tenth Day of April, 2007

JON W. DUDAS  
*Director of the United States Patent and Trademark Office*